(12) United States Patent
Joseph et al.

(10) Patent No.: US 6,484,514 B1
(45) Date of Patent: Nov. 26, 2002

(54) PRODUCT DISPENSER HAVING INTERNAL TEMPERATURE CHANGING ELEMENT

(75) Inventors: Gary Curtis Joseph, Cincinnati; Piyush Narendra Zaveri, Mason, both of OH (US)

(73) Assignee: The Procter & Gamble Company, Cincinnati, OH (US)

( * ) Notice: Subject to any disclaimer, the term of this patent is extended or adjusted under 35 U.S.C. 154(b) by 63 days.

(21) Appl. No.: 09/686,493

(22) Filed: Oct. 10, 2000

(51) Int. Cl.⁷ .......................... F25D 5/00; B65B 63/08; F24J 1/00; F24J 3/00
(52) U.S. Cl. ........................... 62/4; 62/60; 126/263.01; 126/263.08
(58) Field of Search .................... 62/4, 60; 126/263.01, 126/263.05, 263.07, 263.08, 263.06, 263.09

(56) References Cited

U.S. PATENT DOCUMENTS

| | | | |
|---|---|---|---|
| 1,985,424 A | | 12/1934 | Piggott |
| 2,615,447 A | * | 10/1952 | Cohen .................... 126/263.01 |
| 2,703,798 A | | 3/1955 | Schwartz |
| 2,965,576 A | | 12/1960 | Wilson |
| 3,010,613 A | | 11/1961 | Stossel |
| 3,134,544 A | | 5/1964 | Copley |

(List continued on next page.)

FOREIGN PATENT DOCUMENTS

| | | |
|---|---|---|
| AU | 15012/92 | 11/1993 |
| CH | 303374 | 11/1954 |
| CH | 477922 | 9/1969 |
| EP | 0078761 A2 | 5/1983 |
| EP | 0294189 A2 | 12/1988 |
| EP | 0408311 A2 | 1/1991 |
| EP | 1038794 A1 | 9/2000 |
| GB | 809060 | 2/1959 |
| GB | 821793 | 10/1959 |
| JP | 4031271 | 2/1992 |
| WO | WO99/41554 | 8/1999 |
| WO | WO00/43286 | 7/2000 |

Primary Examiner—William C. Doerrler
(74) Attorney, Agent, or Firm—Peter D. Meyer

(57) ABSTRACT

A temperature modifying system for heating or cooling a product including a flexible outer container containing a product and a self-enclosed temperature-changing element is disclosed. The temperature-changing element includes a flexible pouch at least partially immersed in said product. The flexible film pouch may have two components separated by a rupturable barrier that is adapted to burst under an application of pressure allowing the two components to combine or react in an exothermic or endothermic event. The flexible film pouch may alternatively include a saturated salt solution that generates as it drops out of solution.

29 Claims, 15 Drawing Sheets

U.S. PATENT DOCUMENTS

| | | | |
|---|---|---|---|
| 3,585,982 A | 6/1971 | Hollinshead | |
| 3,600,186 A | 8/1971 | Mattson et al. | |
| 3,638,786 A | 2/1972 | Borecki et al. | |
| 3,675,637 A | 7/1972 | Trimble | |
| 3,685,507 A | * 8/1972 | Donnelly | 126/263.08 |
| 3,749,620 A | 7/1973 | Montgomery | |
| 3,866,800 A | 2/1975 | Schmitt | |
| 3,929,678 A | 12/1975 | Laughlin et al. | |
| 3,937,364 A | 2/1976 | Wright | |
| 4,004,711 A | 1/1977 | Ravich | |
| 4,005,195 A | 1/1977 | Jandacek | |
| 4,005,196 A | 1/1977 | Jandacek et al. | |
| 4,196,190 A | 4/1980 | Gehman et al. | |
| 4,272,511 A | 6/1981 | Papantoniou et al. | |
| 4,522,640 A | * 6/1985 | Jagoe | 62/4 |
| 4,596,481 A | 6/1986 | Tanaka | |
| 4,678,460 A | 7/1987 | Rosner | |
| 4,793,323 A | * 12/1988 | Guida et al. | 126/263.07 |
| 4,797,300 A | 1/1989 | Jandacek et al. | |
| 4,812,067 A | 3/1989 | Brown et al. | |
| 4,836,422 A | 6/1989 | Rosenberg | |
| 4,893,955 A | 1/1990 | Zielinski | |
| 4,895,135 A | 1/1990 | Hamasaki | |
| 5,011,681 A | 4/1991 | Ciotti et al. | |
| 5,042,455 A | 8/1991 | Yue et al. | |
| 5,061,481 A | 10/1991 | Suzuki et al. | |
| 5,064,103 A | 11/1991 | Bennett | |
| 5,071,379 A | 12/1991 | Poizot | |
| 5,090,832 A | 2/1992 | Rivera et al. | |
| 5,100,657 A | 3/1992 | Ansher-Jackson et al. | |
| 5,100,658 A | 3/1992 | Bolich, Jr. et al. | |
| 5,104,642 A | 4/1992 | Wells et al. | |
| 5,104,646 A | 4/1992 | Bolich, Jr. et al. | |
| 5,106,609 A | 4/1992 | Bolich, Jr. et al. | |
| 5,120,531 A | 6/1992 | Wells et al. | |
| 5,120,532 A | 6/1992 | Wells et al. | |
| 5,195,658 A | 3/1993 | Hoshino | |
| 5,263,929 A | * 11/1993 | Falcone et al. | 604/89 |
| 5,263,991 A | 11/1993 | Wiley et al. | |
| 5,306,514 A | 4/1994 | Letton et al. | |
| 5,306,515 A | 4/1994 | Letton et al. | |
| 5,306,516 A | 4/1994 | Letton et al. | |
| 5,465,707 A | * 11/1995 | Fulcher et al. | 126/263.08 |
| 5,515,558 A | 5/1996 | Dodge | |
| 5,672,576 A | 9/1997 | Behrens et al. | |
| 5,702,375 A | 12/1997 | Angelillo et al. | |
| 5,935,486 A | * 8/1999 | Bell et al. | 252/70 |
| 5,941,078 A | * 8/1999 | Scudder et al. | 62/4 |
| 5,944,709 A | 8/1999 | Barney et al. | |
| 5,979,164 A | 11/1999 | Scudder et al. | |
| 6,079,405 A | * 6/2000 | Justo | 126/263.08 |
| 6,096,067 A | 8/2000 | Cramer et al. | |

* cited by examiner

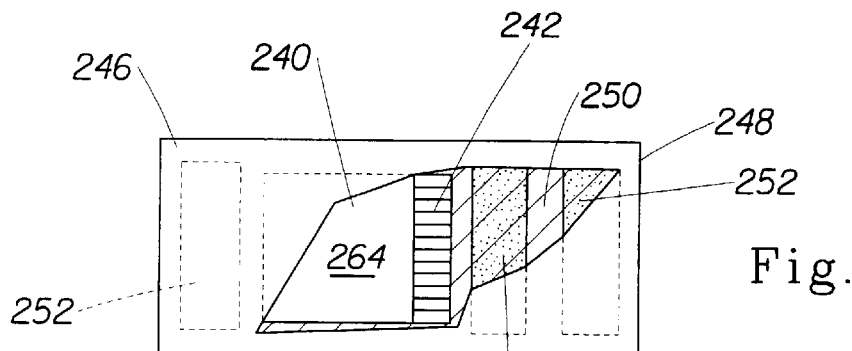
Fig. 13
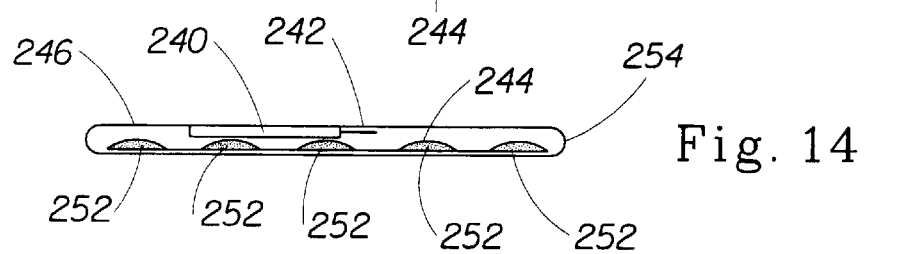
Fig. 14
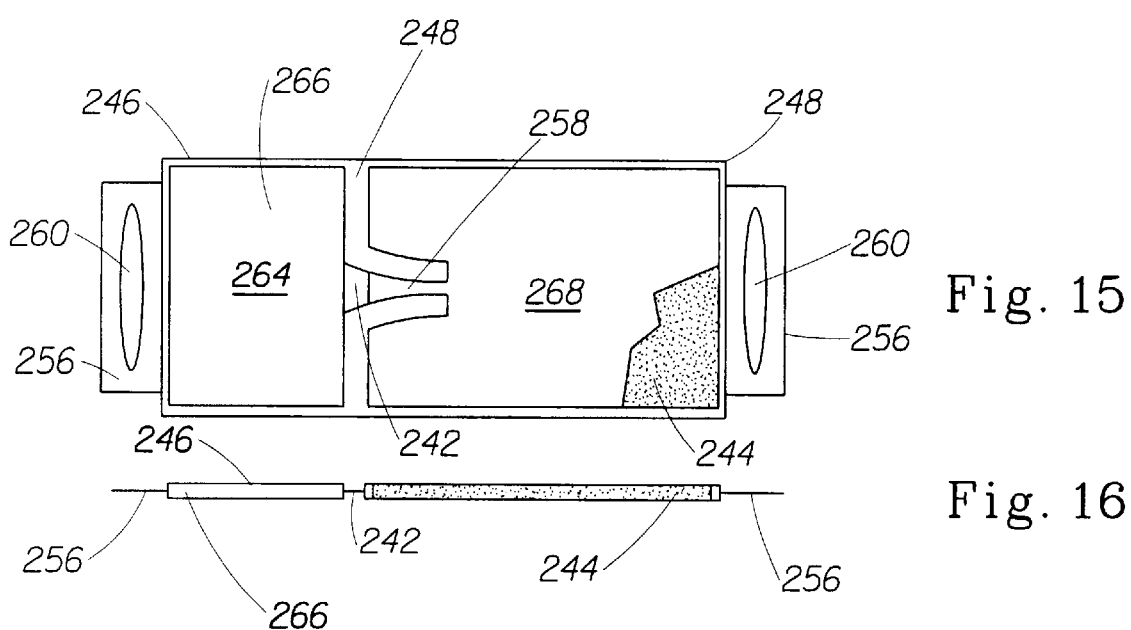
Fig. 15
Fig. 16

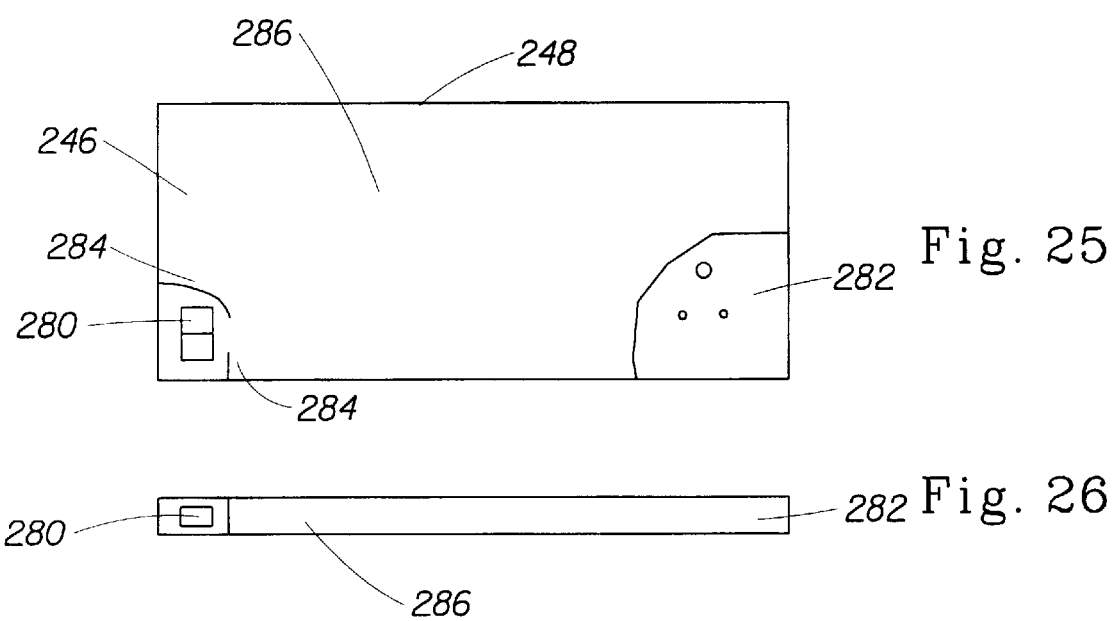

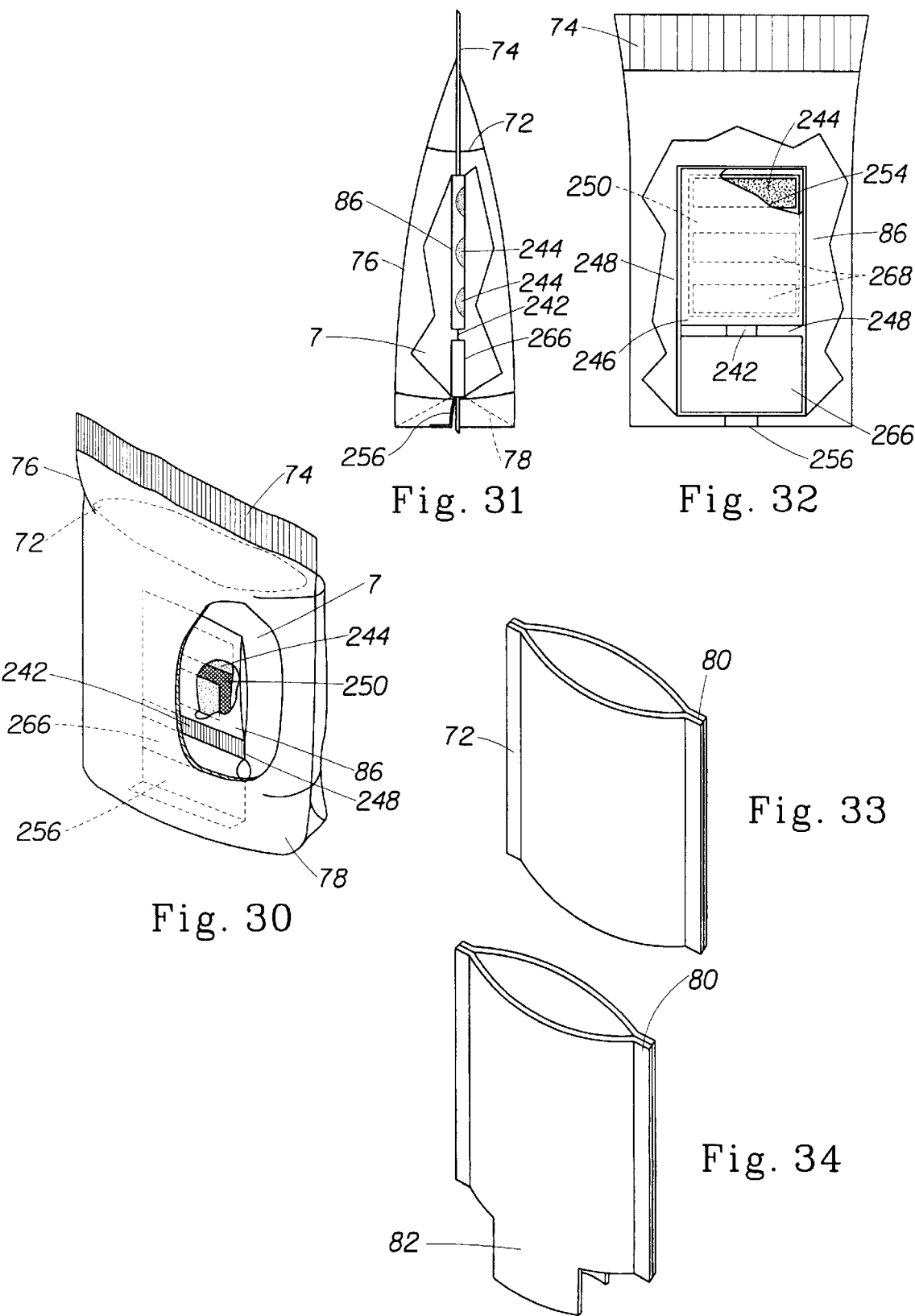

PRODUCT DISPENSER HAVING INTERNAL TEMPERATURE CHANGING ELEMENT

FIELD OF THE INVENTION

The present invention relates to a package containing a product and a flexible, selfcontained heating/cooling element. More particularly, the invention relates to a package containing a flexible, self-contained, chemical-based heating/cooling element that is at least partially immersed in a product.

BACKGROUND OF THE INVENTION

Various types of self-heating containers are known in the art for heating the contents (mainly foodstuffs) to a desired temperature. For example, various external heating systems that heat a foodstuff or beverage through conductive heating are known. For example, U.S. Pat. No. 4,895,135 discloses a system that utilizes a partial form of immersion heating and can be described as a container body [that] is formed of a sheet member including a metal foil and a synthetic resin layer attached on at least one side of the metal foil. The sheet member is folded to have a W-shaped cross section and is heat-sealed along the vertical and upper edges. The inverted V-shaped portion of the folded sheet defines a chamber for accommodating the envelope outside the container body. Further, U.S. Pat. No. 4,895,135 discloses a self-heating container in which the primary bag has a notch formed to permit rupture of the primary bag upon pulling of one end of the bag. The self-heating container a water permeable envelope on at least the lower surface facing the primary bag. A self-heating container wherein the outer shell member comprises a receptacle and a cover removably secured to the receptacle. This uses an activation means whereby a pull-tab is used to break the primary water bag and the pressure of the expanding gases from a first reaction breaking another fluid bag to start another reaction. Further, the invention as disclosed is an open system with the opportunity for the slurry of the mixed aqueous solution and reactant to spill out if the package is mishandled. The package is a relatively complex design in which the reactive components may come into contact with a user or the product being heated. Also, the heating element is located on an exterior of the package, which may allow heat to migrate outside of the package.

U.S. Pat. No. 5,263,929 describes an infusion administration container for infusing a physiologic fluid into an animal, which comprises: a first flexible bladder divided into at least two compartments separated from one another, each of the compartments containing at least one first chemical agent; a second flexible bladder disposed outside the first flexible bladder and containing at least one second chemical agent, the first and second chemical agents when combined resulting in an exothermic reaction; passageways interconnecting each of the compartments of the first bladder with the second bladder; manually openable closure means disposed within each of the passageways. The activation mechanism consists of a dial or twist-tie to turn that allows water to flow into the system from outside a connected container to the fluid to be warmed, activation means incorporates additional components outside of the package itself. Their embodiment also has a discontinuous heating element where the components are not co-located within one packaging system, thus not allowing immediate fluid uptake for a faster heating response. Also, with the discontinuous system an inefficient use of heat transfer is afforded by having additional volume outside of the package for hot air to travel to which is expended to the environment instead of the product to be heated. Last, such an embodiment would require complicated manufacturing steps and would not be an innocuous system for the dispensing of consumer heated products from small sizes packaging.

U.S. Pat. No. 5,979,164 relates generally to containers for heating or cooling materials such as food, beverages, medicines, and the like and, more specifically, to a container that includes an internal module that adds heat to or removes heat from the materials in the surrounding container. U.S. Pat. No. 5,979,164 further discloses a flexible embodiment of a container that comprises a container body having a tapered, tube-like or pouch-like shape and made of a flexible or pliable material such as soft plastic. Soft metal foil of the type commonly used in toothpaste tubes would also be suitable. This patent utilizes the distal end of an elongated member to break a barrier to allow mixing of reactants when the elongated member is extended. Again, the patent discloses a relatively complex activation means that requires additional activation elements.

SUMMARY OF THE INVENTION

The present invention provides a temperature modifying system for heating or cooling a product that includes a flexible outer container containing a product and a self-enclosed temperature-changing element. The temperature-changing element includes a flexible pouch at least partially immersed in said product. The flexible film pouch may have two components separated by a rupturable barrier that is adapted to burst under an application of pressure allowing the two components to combine or react in an exothermic or endothermic event. The flexible film pouch may alternatively include a saturated salt solution that generates as it drops out of solution.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify identical elements, reference numerals with the same final two digits identify corresponding elements, and wherein:

FIG. 13 is a top view of the temperature changing element of one embodiment of the present invention.

FIG. 14 is a side view of the temperature changing element of one embodiment of the present invention.

FIG. 15 is a top view of the temperature changing element of one embodiment of the present invention.

FIG. 16 is a side view of the temperature changing element of one embodiment of the present invention.

FIG. 25 is a top view of the temperature changing element of one embodiment of the present invention.

FIG. 26 is a side view of the temperature changing element of one embodiment of the present invention.

FIG. 30 is a perspective view of the outer container of one embodiment of the present invention.

FIG. 31 is a side view of the outer container of one embodiment of the present invention.

FIG. 32 is a plan view of the outer container of one embodiment of the present invention.

FIG. 33 is a perspective view of the outer container insert of one embodiment of the present invention.

FIG. 34 is a perspective view of the outer container insert of one embodiment of the present invention.

DETAILED DESCRIPTION OF THE INVENTION

Figure 1:
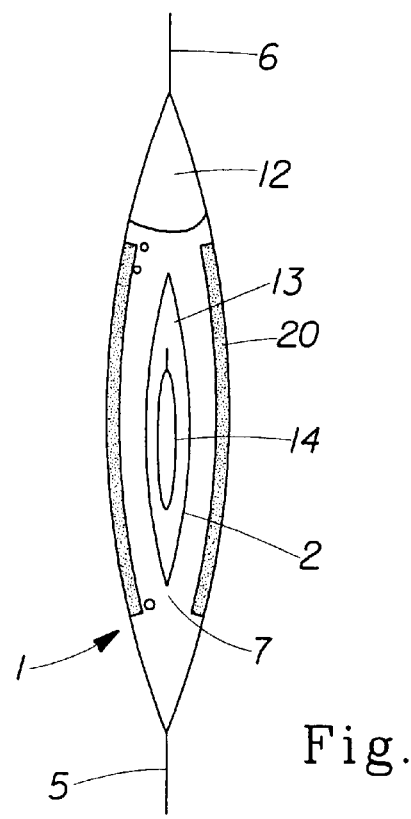
FIG. 1 is a side view of the outer container of one embodiment of the present invention.
Figure 2:
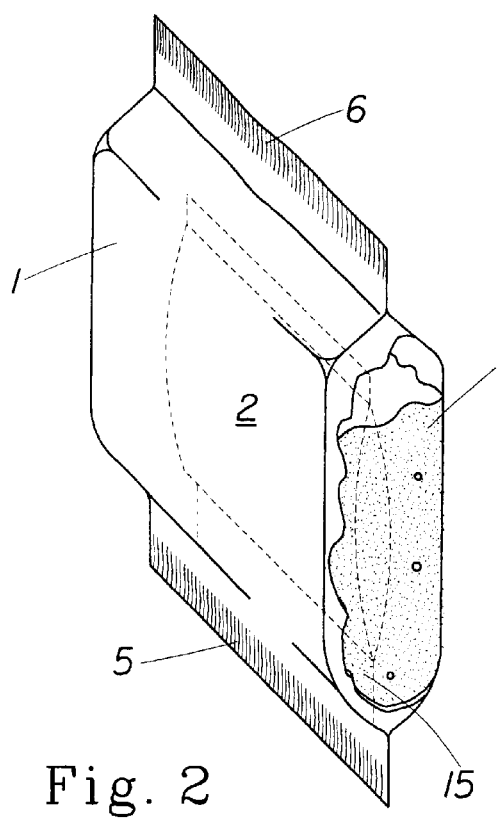
FIG. 2 is a perspective view of the outer container of one embodiment of the present invention.
Figure 3:
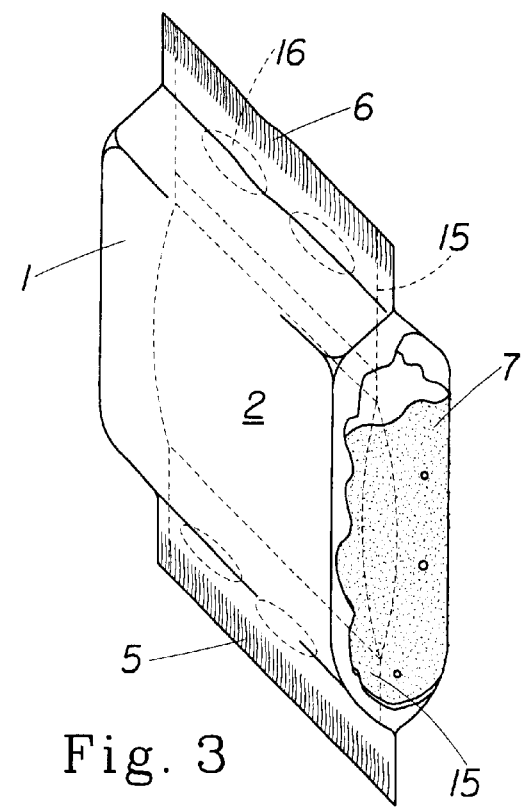
FIG. 3 is a perspective view of the outer container of one embodiment of the present invention.

The present invention relates to the use of a self-contained, consumer activated heat-generating element that is at least partially immersed in a product that is to be heated. The heating/cooling element preferably includes a substantially moisture impermeable outer layer for storage and barrier purposes. The substantially moisture impermeable outer layer, for example, may comprise a film. Different film materials can allow various moisture transmission rates and oxygen barrier levels. Films can be a single material (i.e. nylon) or a combination of materials that are co-extruded and/or laminated together. A preferred film material is a laminate of which the middle layer may be foil. The foil layer provides virtually no moisture loss and no oxygen permeability and, thus, protects the contents of the heating/cooling element and prevents those contents from escaping the heating/cooling element. Thus, the foil barrier ensures package integrity over time. The heating/cooling element may be disposable or re-usable as in the case of a re-fill pack.

The heating/cooling element may generate heat (i.e., an exothermic event) or may absorb heat (i.e., an endothermic event). The heating/cooling element may, for example, be based on the combination or reaction of two or more components such as the addition of water to an anhydrous mixture, or may be based on the use of a super cooled salt solution, such as a sodium acetate or other similar material, that generates heat as the salt crystallizes out of solution due to a system disruption. The components of the heating/cooling element are preferably contained in a substantially impermeable package so that the components do not contaminate the product to be heated. A heating/cooling element based on the combination or reaction of two or more components, for example, may contain one or more compartments that house the components separately from each other. A compartment that contains a first component (e.g., a liquid component such as water) may include a pouch having a rupturable barrier such as a frangible seal. The pouch and the second component may be housed in a substantially impermeable container, such as a pouch formed from an impermeable film. The heating/cooling element may be activated by applying pressure to the compartment through the substantially impermeable container, such as by kneading, squeezing, pressing, etc., to burst the rupturable barrier of the compartment and to expel at least a portion of the first component out of the compartment and into contact with the second component.

The present invention provides an easy method for heating a product at least partially via immersion heating that includes a simple activation means. Further, a simple, cost-effective exothermic or endothermic execution is provided in which the product and the heating/cooling element are contained within the same system to allow for a fast heating response. An enclosed system allows for efficient use of the heating/cooling element because energy loss through external heat transfer between the heating/cooling element and the external environment can be reduced. Thus, when the heating/cooling element is at least partially immersed in a product, more efficient heat transfer can occur between the heating/cooling element and the product than if the heating/cooling element was adjacent to the product because more surface area of the heating/cooling element may be adjacent to or in contact with the product. For example, as the system begins to generate or absorb heat, there may be conductive heat transfer through the heating/cooling element walls, and convective and conductive heat transfer through the product. When the product is sufficiently warmed or cooled, the package can be opened and the product may be used in the package or dispensed from the package. The system of the present invention can be used in packages such as bottles, tubes, tubs, sachets, pouches, stand-up pouches, thermoformed containers and the like that contain one or more products.

The package of the present invention may also, for example, allow for improved dispensing of a particular product and/or improved product efficacy through a temperature change. A high viscosity liquid product or a solid product may be heated to decrease the viscosity of the product and allow the product to be easily dispensed from the package. Also, a product containing an active to be absorbed in to the skin or into a blood vessel may benefit from the presence of a heated carrier product such as a lotion that may enhance the absorption of the active into the skin or a blood vessel through opening of pores, capillary vacillation, etc.

Outer Container

One embodiment of a package of the present invention is shown in FIG. 1. In this embodiment, the package may comprise an outer container 1 containing a product 7 and a heating/cooling element 2 (also referred to as a temperature-changing element) at least partially immersed in the product 7 within the container 1. In one embodiment, the outer container 1 may include any container having one or more generally flexible and/or deformable outer surface such as a side wall that allows pressure to be applied through the outer container to at least a portion of the heating/cooling element in order to activate the heating/cooling element. The outer container 1, for example, may comprise a flexible bottle, a flexible tube, a flexible tub, a sachet, a pouch, a stand-up pouch, a flexible thermoformed container, cartons or the like. The outer container may be comprised of one or more polymeric materials, metallized structures, laminate structures, lined paperboards, co-extruded films and the like.

Figure 29:
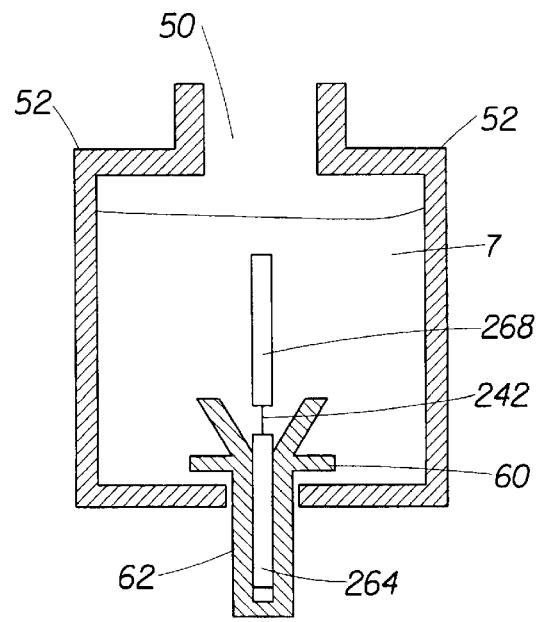
FIG. 29 is a side view of the outer container of one embodiment of the present invention.
Figures 40, 41:
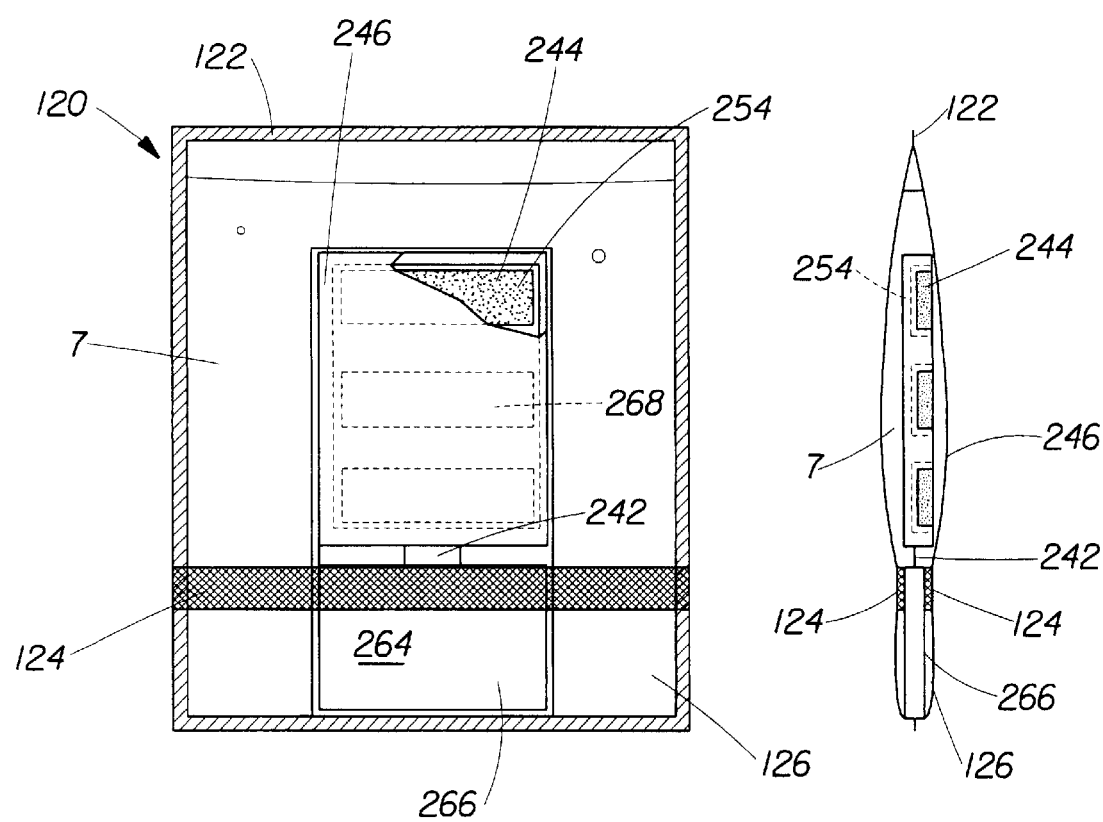
FIG. 40 is a plan view of the outer container of one embodiment of the present invention.
FIG. 41 is a side view of the outer container of one embodiment of the present invention.

Alternatively, FIG. 40 shows that a portion of the heating/cooling element may extend outside of the outer container 1 such as at a seal line 124 which in this case is a suitable adhesive that joins the temperature changing system to the outer container 1 and cuts the product 7 off from the lower chamber 126 where the fluid containing portion 266 of the temperature changing system may reside. In this embodiment, pressure may be applied to the portion of the heating/cooling element that extends out of the outer container 1 to activate the heating/cooling element as described below. FIG. 29 shows a variation of this concept where a portion 264 of the temperature changing systems resides in a plug 62 that extends outside of the container 52. By squeezing the plug where the fluid container 264 is, the fluid is expelled into chamber 268 which heats/cools the product 7.

The outer container 1 may also include some form of insulation, such as insulation layers 20, that insulates the exterior of the outer container 1 from the internal heating/cooling element 2 and increases the efficiency of the heating/cooling of the product 7 by reducing the heat transfer between the product 7 and the outer container 1. The insulation layer may extend over substantially the entire exterior and/or interior surface of the outer container 1, may extend over at least a portion of the exterior and/or surface of the outer container 1 corresponding to about the size of the heating/cooling element 2, may cover a portion of the exterior and/or interior of the outer container that a consumer might touch during the heating/cooling process or during the period where the product is dispensed or used, may cover any other portion of the outer container 1, may be exterior to the outer container 1 (e.g., as part of an additional structure that is exterior to the outer container 1 such as an additional container inside which the outer container 1 is located), etc. The insulation layer 20 may be a separately attached layer or an integral part of the material forming the outer container 1 such as a co-extruded or laminated structure. Examples of possible insulating materials include, but are not limited to, foamed polyethylene, silicone rubber, a fibrous cellulose structure, or a dimpled thermoformed film with a rigid thickness to provide air pockets as insulation (lattice with a large amount of void space) and the like.

Furthermore, the outer container's external surface may also include a useful layer that may be used to perform a function related to the product contained in the package. A package containing a hair treatment product, for example, may include bristles or tines on the outside surface of the outer container to aid in dispensing the product onto hair follicles. A package containing a skin lotion may include an outer container that has an abrasive surface that may be used to exfoliate the user's skin before or after the lotion is applied. The outer container may also include an absorbent structure that may aid in removing a product from a target surface to which the product has been applied.

In another embodiment, the outer container 1 may be attached to or housed within a device that may assist in using or dispensing of the product. In the case of a hair treatment product, for example, the outer container 1 may be housed within a hair-brush or comb that spreads the hair treatment onto hair follicles. Alternatively, a container having a cleaning solution may be housed inside a sponge, brush, wipe, abrasive scrubbing implement, etc. that may be used to scrub a target surface using the product from the outer container 1. See e.g., FIG. 35.

The outer container 1 may be formed and/or sealed in any manner known in the art. For example, an outer container formed out of a polymeric film may be sealed via one or more of the following: heat sealing, ultrasonic bonding, radio frequency bonding, adhesive bonding, etc.

The outer container may further include an optional opening means 6. For example, the opening means may be, but not limited to, rupturable barriers such as frangible seals, perforations, tear strips, Ziplock™, and the like. Alternatively, the outer container may be cut open to access the product. The opening 6 may also be sized or designed to prevent the heating cooling element from exiting the outer container when the product is dispensed if the heating/cooling element is not otherwise attached or restrained within the outer container. For example, the opening 6 may include a tapered dosing channel to prevent the heating/cooling element 2 from exiting the outer container during use. The outer container 1 may also include a dispensing attachment such as a spout, an applicator tip, spray head or the like in order to aid in product dispensing.

Product Contained within Outer Container

A package of the present invention, for example, may include one or more products such as, but not limited to, liquids, shampoos, oils, waxes, emollients, lotions, moisturizers, medicaments, pastes, surfactants, gels adhesives, suspensions, solutions, enzymes, soaps, cosmetics, liniments, beverages, soups, cheeses, flowable particulates and the like.

In one embodiment, for example, the product 7 may be generally flowable and may be dispensed from or used within the container 1. "Flowable" is defined for the purposes of the present invention as a material that is in a substantially liquid state, substantially liquid state with suspended particles/granules/foods, a non-packing powder or granule and the like. The product may be flowable in a particular state, but not flowable at another state. For example, if a product is initially non-flowable (e.g., a solid composition) prior to activation of the heating/cooling element 2, it may become flowable after being heated by the heating/cooling element (e.g., a wax may be heated from a solid state into a substantially liquid "flowable" state before it is used). Conversely, a product that is flowable prior to activation of the heating/cooling element 2 may be cooled to a substantially non-flowable state by the heating/cooling element before the product is used.

The product, 7, contained within the outer container is defined as any material that is in one part fluid in nature or flowable at the time of usage. Usage is defined as when the product is dispensed from the package or in its proper physical state within the package. Herein there are many examples of product within the container; product that is to be dispensed, product that is to have a secondary item immersed within it, product is to be used for energy storage, product to be consumed.

The product can be dispensed from the outer container or may be used within the outer container. For example, an oil may be heated for a hot hair therapy application without a secondary heating means (e.g., boiling water) and dispensed to a person's hair. Alternatively, an item may be dipped or immersed into the product in the outer container after the product has been heated or cooled. For example, a beauty treatment, such as for hands, feet, fingernails, etc., may be provided by heating a wax until the wax changes phases (e.g., solid to liquid) and a user may dip or immerse hands, fingers feet, etc. into the liquid wax.

Heating/Cooling Element

The container 1 of the present invention may also include a heating and/or cooling element such as shown in FIGS. 9–26. The heating/cooling element may include an exothermic or endothermic system that provides a heating or cooling effect, respectively. The systems may include heating/cooling by, but not limited to, reactions, heats of solution, oxidation reactions, crystallization, corroding alloys, zeolite-liquid systems and/or heats of neutralization.

One embodiment of a heating/cooling element may include a solid-liquid or liquid-liquid heating/cooling system, such as an anhydrous reaction system, a heat of solution system, a zeolite system, an electro-chemical system, etc. A solid-liquid heating/cooling system includes any system in which an exothermic or endothermic change occurs during the combination or mixing of two or more components where at least one component is substantially liquid in nature (e.g., water) and at least one component is substantially solid in nature (e.g., anhydrous salts). A liquid-liquid heating/cooling system includes any system in which an exothermic or endothermic change occurs during the combination or mixing of two or more components where two or more of the components of the system are in a substantially liquid form.

Figure 11:
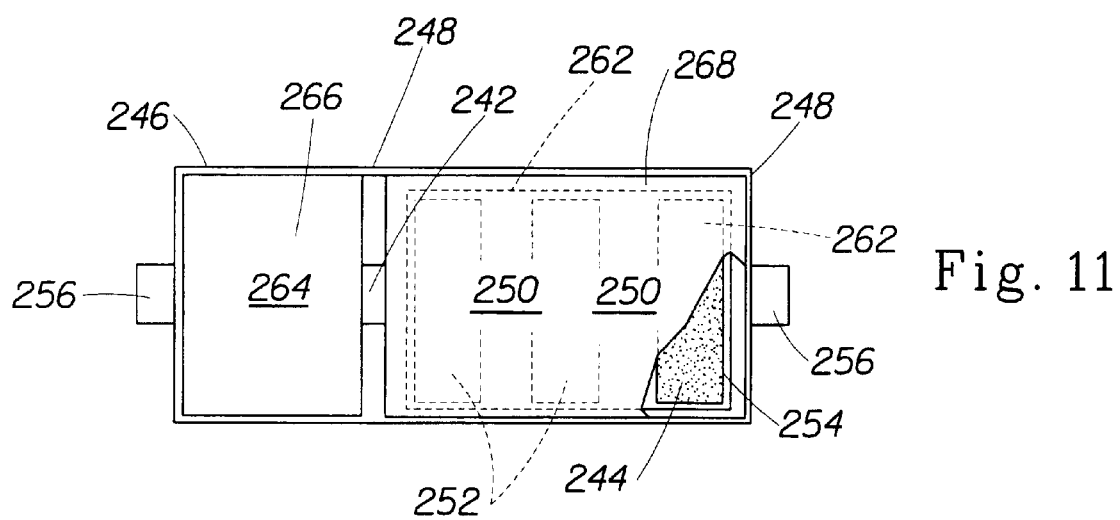
FIG. 11 is a top view of the temperature changing element of one embodiment of the present invention.
Figure 12:
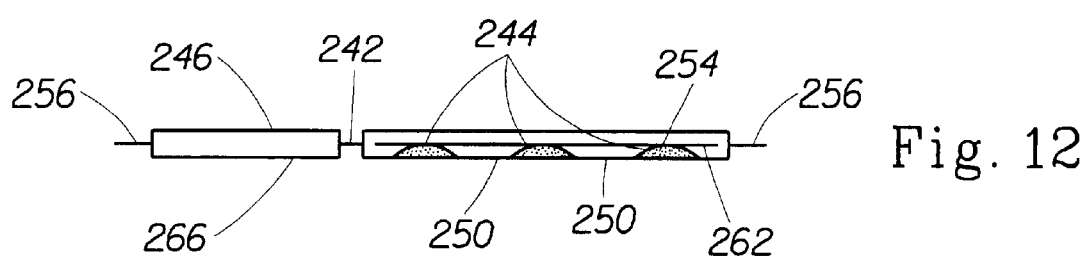
FIG. 12 is a side view of the temperature changing element of one embodiment of the present invention.

In one embodiment, the heating/cooling element may comprise a self-enclosed heating/cooling system. The heating/cooling system may include a substantially moisture impermeable outer layer 246, which may be flexible or rigid at least partially so for the purpose of activation. For example, the moisture impermeable outer layer 246 may be a metallized film, foil laminate film, MYLAR®, a formed metal sheet or other water or moisture impermeable materials. The moisture impermeable outer layer 246 may also include a material having optimal thermal conductive parameters such as a foil that permits greater thermal diffusivity and/or conductivity. The heating/cooling system may include at least two components of a solid-liquid or a liquid-liquid heating system housed within the moisture impermeable outer layer 246. The heating/cooling system, for example, may include a rupturable pouch 240 that contain(s) a first component of the heating/cooling system. The rupturable pouch may be formed from a metallized film or other material having a low moisture vapor transmission rate (MVTR) in order to minimize losses of the liquid component(s) contained within the pouch or entry of liquid or moisture into the pouch that may contaminate the solid component(s) contained within the pouch prior to activation of the heating/cooling element. The rupturable pouch 240 may include a frangible seal 242 to allow a user to rupture the seal by squeezing or otherwise applying pressure to the heating/cooling element and to release the first component from the rupturable pouch. Alternatively, the rupturable pouch may include weakened portions in the pouch material such as scores, perforations and the like, pull tabs, may include metal shavings or other items that may puncture the rupturable pouch upon the application of pressure, or may include any other means of rupturing a pouch known in the art. The heating/cooling element may also include a second component 244 of the heating/cooling system. The second component 244 may, for example, be contained loosely within the water impermeable outer layer 246 or, if a solid component, be contained within one or more porous, liquid permeable compartments 252 such as shown in FIGS. 11–14, 19, and 20. The liquid permeable compartments 252 may be formed by a porous material such as a porous cellulosic material (e.g., wet-laid or air-laid), a porous polymeric film such as a polyethylene film which has been needle-punched or vacuumed-formed, a polymeric mesh material such as a woven nylon mesh material such as Nitex™ supplied by Sefar America Inc., Depew, N.Y., etc. Preferably, the pore size of the porous material is smaller than the particles of the solid second component(s) 244. The heating/cooling element may include one or more compartments that house the solid second component(s) 244 located within the moisture impermeable outer layer 246. The solid second component(s) 244 may be packed within the one or more compartments of the heating/cooling element at a component volume in the range from about 60% to about 95% of the available compartment space in order to keep the solid second components in close proximity to each other. Tightly packing the solid second component(s) in one or more compartments can prevent the solid second component(s) from shifting in the heating/cooling element and can also prevent "saddle-bagging" of a flexible heating/cooling element. Further, keeping the solid second component(s) in a packed state within one or more compartments can promote even heating/cooling in the heating/cooling element via a defined and repeatable amount of component per unit volume, can reduce the surface area exposure and thereby reduce the rapid surface convective losses of the heating/cooling element, and can better meter the rate that the heat produced or consumed by the exothermic or endothermic system due to forced conduction through the packed bed. In some embodiments, the pouch may further distribute any liquid component(s) across the surface of the solid second component(s) 244 through wicking and/or capillary action. Additionally, or in the alternative, a liquid distribution layer such as the layer 262 may be provided in proximity to the solid second component(s) 244 of the solid-liquid system to distribute any liquid component(s) across the surface of the solid second component(s) 244 through wicking and/or capillary action such as shown in FIGS. 11 and 12. This may be especially useful in embodiments where the solid second component(s) are contained in a porous sheet 254 that will not readily wick the aqueous solution across its surface or in embodiments where the solid second components are contained loosely within the water impermeable outer layer 246. The liquid distribution layer, for example, may include a cellulosic material such as paper towel layers such as Bounty® sold by the Procter & Gamble Company of Cincinnati, Ohio, capillary channel fibers, hydrophilic woven and non-woven materials, apertured formed film or any other distribution materials known in the art. Further, absorbent, wicking or capillary action materials such as cellulosic materials, superabsorbent polymers and/or other hydroscopic materials may be interspersed within the particles of the solid second component(s) in order to allow for a more even dispersion of the liquid component(s) throughout the solid second component(s) allowing for full usage of the component(s). This may be especially useful in embodiments where the solid second component(s) are mixed with additives such as encapsulated phase change materials such as Thermasorb Series® available from Frisby Technologies, Winston-Salem, N.C. or polyethylene powders that are somewhat hydrophobic. Further, the addition of cellulosic materials may be beneficial in embodiments where another additive such as guar or xanthan gum is added to one or more of the component(s) to help tailor the temperature profile but may also affect the rate at which the reaction occurs due to a viscosity change in an aqueous solution liquid component. Further, the addition of cellulosic materials may also be beneficial where reactive materials such as magnesium sulfate or calcium chloride, in a packed form, may form a thin crystal sheet across the areas where the water first comes in contact with them. This may impede the progress of a liquid component to areas of the packed bed that are below the crystal surface.

Another embodiment of a heating/cooling element includes a solid-liquid and/or liquid-liquid heating/cooling system such as shown in FIGS. 11, 12, 15–18 and 21–24 in which multiple components of the system can be housed in adjacent chambers separated by a rupturable barrier 242 such as a frangible seal or other rupturable barrier such as described above. The heating/cooling element, for example, may include a water impermeable outer layer 246 formed into a pouch having two or more chambers that separately house at least a first component and a second component of the system prior to activation. Upon compression of one or more chambers of the heating/cooling element, the rupturable barrier 242 may burst and allow the first and second component(s) to come into contact with each other.

Figure 23:
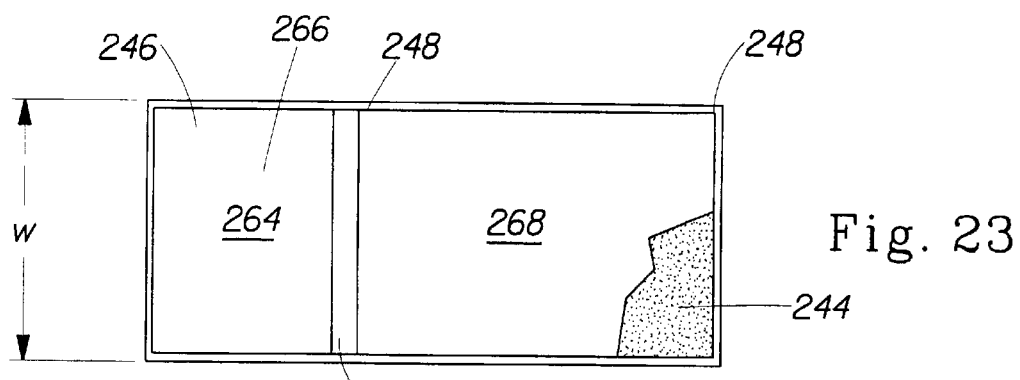
FIG. 23 is a top view of the temperature changing element of one embodiment of the present invention.

In one embodiment such as shown in FIG. 23, the heating element may include a pouch having a permanent or strong seal 248 extending about at least a portion of the periphery of the pouch (e.g., the pouch may include two or more pieces of film sealed around four sides, may include a film folded over itself and sealed around three sides, etc.). The pouch may include multiple chambers 266 and 268 that are separated by one or more frangible seals 242. In the embodiment shown in FIGS. 23 and 24, for example, the pouch may include a first chamber 268 and a second chamber 266 separated by a frangible seal 242. The first chamber 268 may contain a first component and the second chamber 266 may contain a second component. The first and second components may include a solid component (e.g., anhydrous salt, electrochemical alloys) and a liquid component (e.g., water), a liquid component and a solid component or a liquid component and a second liquid component. Applying pressure to one or more of the chambers such as squeezing, pressing, kneading, etc. may rupture the frangible seal 242 and mix the components of the first and second chambers together to release or absorb energy from the environment.

Figure 24:
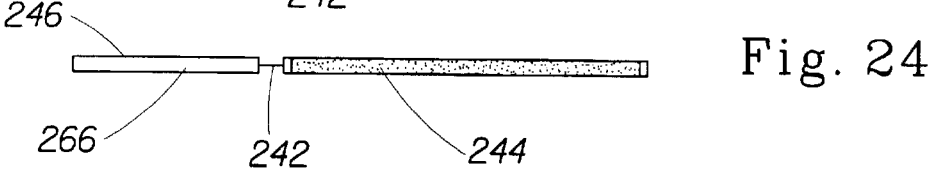
FIG. 24 is a side view of the temperature changing element of one embodiment of the present invention.

FIGS. 11, 12, 15, 16, 17, 18, 21 and 22, for example, show further embodiments of a heating/cooling element including a first component 264 housed in a first chamber 266 and a second component 244 housed in a second chamber 268 separated by a frangible seal 242. In these embodiments, a frangible seal 242 separates the first chamber 266 from the second chamber 268. The frangible seal 242 may extend a portion of the width W of the heating/cooling element such as shown in FIGS. 11, 15, 17 and 21 or may extend the entire width of the heating/cooling element between the first and the second chambers 266 and 268 such as shown in FIGS. 23 and 24. In one embodiment, the frangible seal may be designed narrowly such as shown in FIG. 11 to minimize the backflow of the first component 264 into the first chamber 266 after activation. Alternatively, or in addition, the heating/cooling element may also include a channel 258 such as shown in FIG. 16 that further restricts the backflow of the liquid component 264 into the first chamber 266 after activation. As shown in FIGS. 11, 12, 13, and 14, the heating/cooling element may also include a solid component housed in multiple compartments 252 and may be held in place by porous pouch 254. Alternatively, a solid component may be contained loosely within a chamber (e.g., the second component 244 shown in FIGS. 15–18 and 21–24 may be a solid component contained loosely within the second chamber 268. The heating/cooling element may further comprise one or more attachment tabs 256 for attaching the heating/cooling element to the structure of the package such as to a portion of the outer container 1, etc.

Figure 21:
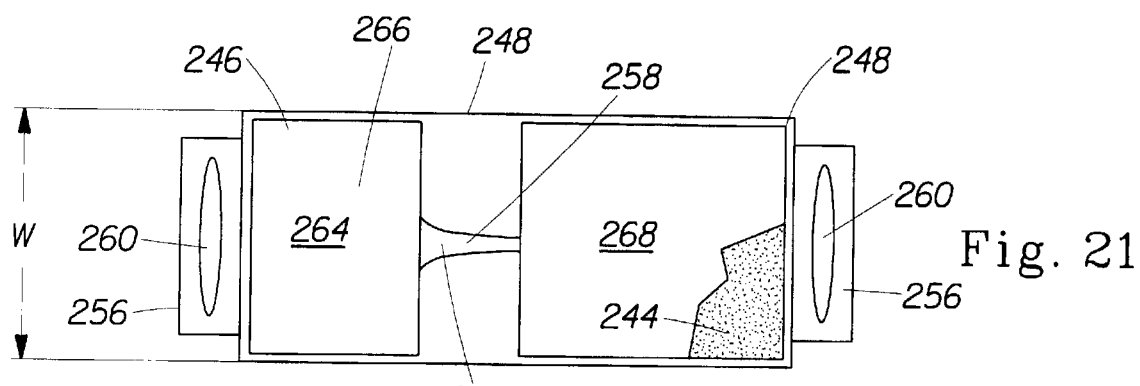
FIG. 21 is a top view of the temperature changing element of one embodiment of the present invention.
Figure 22:
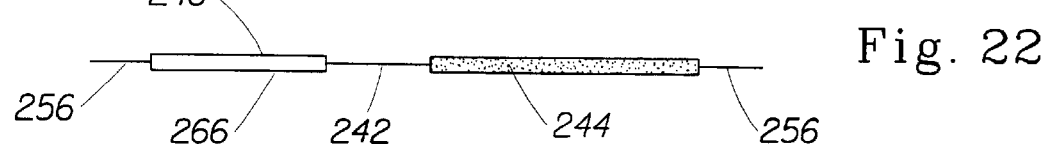
FIG. 22 is a side view of the temperature changing element of one embodiment of the present invention.

FIGS. 21 and 22 show yet another embodiment of a heating/cooling element that may be used in a solid-liquid or a liquid-liquid heating/cooling system. In this embodiment, a first liquid component can be housed in a first chamber 266 and a second liquid component or a solid component can be housed in a second chamber 268. The frangible seal 242 may extend across all or a portion of the width W of the heating cooling element, and channel 258 may extend into the second chamber 268 in order to prevent a backflow of the components into the first chamber 266 after activation.

Figure 17:
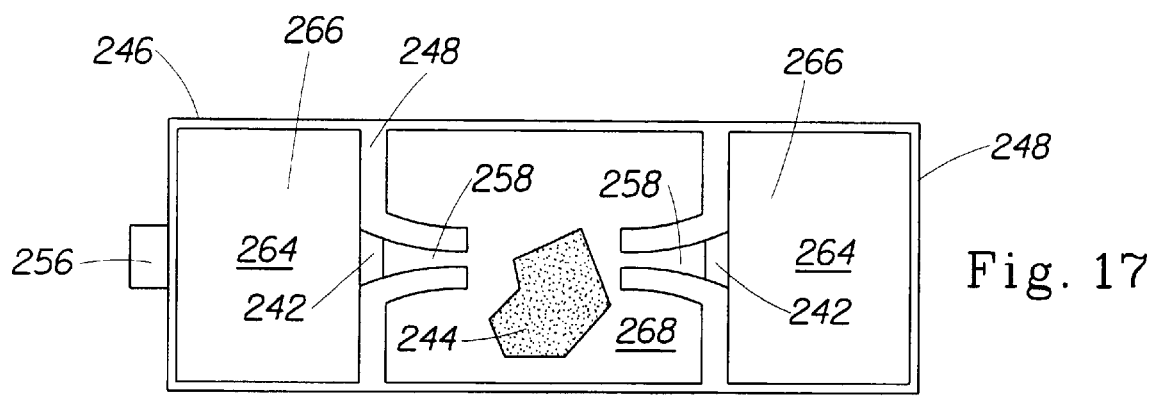
FIG. 17 is a top view of the temperature changing element of one embodiment of the present invention.
Figure 18:
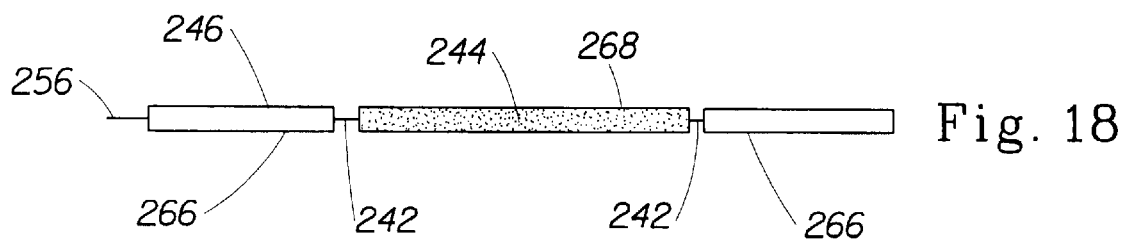
FIG. 18 is a side view of the temperature changing element of one embodiment of the present invention.

FIGS. 17 and 18 shows a temperature-changing element with at least two channels 258 that may be used for a substantially one-way flow of fluid components into the chamber 268. This allows for delivery of the fluid component to multiple locations within the chamber 268, which may be especially useful in larger packages or packages that may have varying orientations during activation such that wicking the liquid component(s) may become increasingly difficult.

Figure 19:
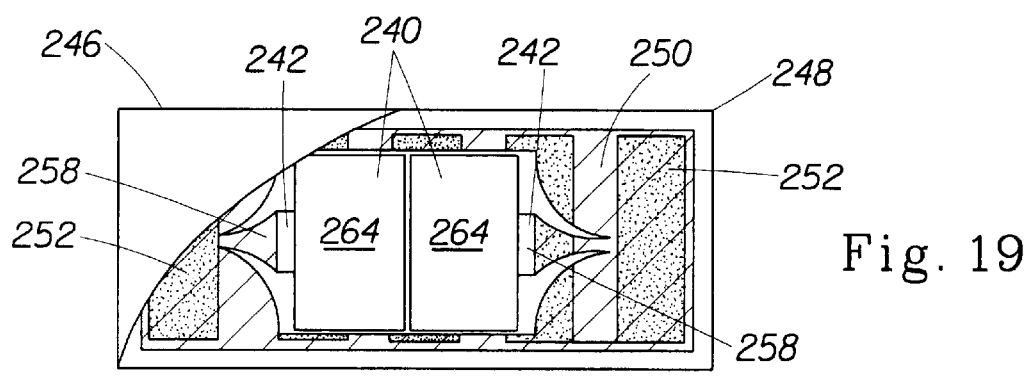
FIG. 19 is a top view of the temperature changing element of one embodiment of the present invention.
Figure 20:
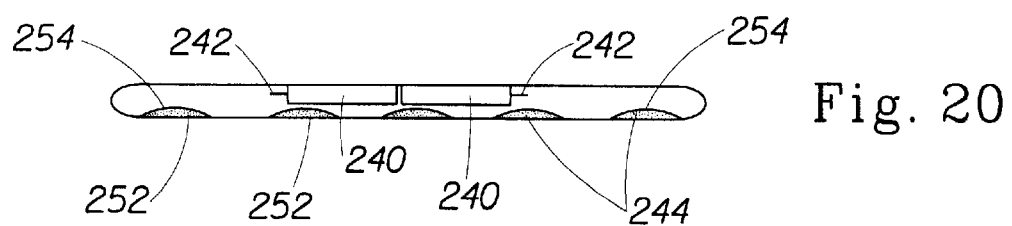
FIG. 20 is a side view of the temperature changing element of one embodiment of the present invention.

FIGS. 19 and 20 show a temperature-changing element in which a container 240 can be located above the reactant containing compartments 252. The figure also shows multiple exit channels 258 for the container 240. The compartments 252, for example, may be made of discrete packets in which one side is a porous material 254 and the other is a fluid impermeable film such as polyethylene. In the specific embodiment, the porous material 254 may be attached to the exterior package. This configuration disassociates the fluid bag from the heat generator and allows for the centralization of the fluid bag.

FIGS. 21 and 22 show an alternative embodiment of a temperature-changing element where the exit channel 258 is located within the seal area 248 to allow for the full use of the heating chamber. This may be especially beneficial for filling operations where channels extending into the chamber 268 may be an obstruction.

An exothermic solid-liquid heating system can include solid components such as calcium oxide, calcium carbonate, calcium sulfate, calcium chloride, cerous chloride, cesium hydroxide, sodium carbonate, ferric chloride, copper sulfate, magnesium sulfate, magnesium perchlorate, aluminum bromide, calcium aluminum hydride, aluminum chloride, sulfur trioxide (alpha form), zeolites (e.g., Cabsorb® 500 Series natural zeolite based on the mineral chabazite), mixtures thereof and other solid components of solid-liquid exothermic systems known in the art and combinations there of. An endothermic solid-liquid cooling system can include solid components such as sodium sulfate*$10H_2O$, sodium bicarbonate, potassium perchlorate, potassium sulfate, potassium chloride, potassium chromate, urea, vanillin, calcium nitrate, ammonium nitrate, ammonium dichromate, ammonium chloride and other solid components of endothermic systems known in the art. These solid components may be in an anhydrous form and may be used such as in a powder, granular or prilled condition. These compounds are generally hydroscopic and dissolve in or react with a liquid component, such as water, and give off or absorb heat.

Further exothermic solid-liquid systems can include an electrochemical reaction including solid components such as iron, magnesium, aluminum, or combinations thereof that react in the presence of salt and water. In these embodiments, the liquid component may include a salt-water solution or may include water if salt is included with the solid component(s) 244.

Yet another solid-liquid or liquid-liquid exothermic system includes systems that use of heat of neutralization to give off heat using acid and base components such as citric acid having a pH of about 3 or 4 and calcium oxide having a pH of 12 in approximately a 2 to 1 ratio, respectively.

In another embodiment, FIGS. 25 and 26, of a heating element may include use of aqueous salt solution(s) super-cooled so that the heat packs can be carried in the super-cooled condition and activated with internal release of heat when desired. Sodium acetate, sodium thiosulfate and calcium nitrate tetrahydrate are examples of suitable salts.

FIGS. 25 and 26, for example, show a heating element comprising of the supercooled salt 282 in a pouch 286 with activator 280. To activate crystallization of solution 282 one can use the scraping of two metal pieces, the addition of additional crystals that comprise the solution, or any other activation method known in the art. As shown in FIG. 26, the activator 280 may be located in a corner of the pouch with restraining seals 284 holding it in an easily identifiable location. The solution 282, for example, may be 1:1 ratio by weight of sodium acetate and water mixed at an elevated temperature and cooled to ambient temperature in a super saturated state prior to activation.

Energy Storage Device

The outer container may also include an energy storage element. The energy storage element can include, but not limited to, gels (e.g. combinations of 1% polyacrylamide and water), phase change materials (e.g. Thermasorb®, Frisby Technologies, Winston-Salem, N.C.), and the like. For example, one can provide an energy storing thermal pad without the use of a separate device to supply the energy to be stored. The heating/cooling element 2 can be at least partially immersed in or adjacent to the energy-storing media. Once the system is activated the energy-storing media stores the energy and meters it out over time, providing a longer duration thermal pad.

Heating Element Attachment

Figure 4:
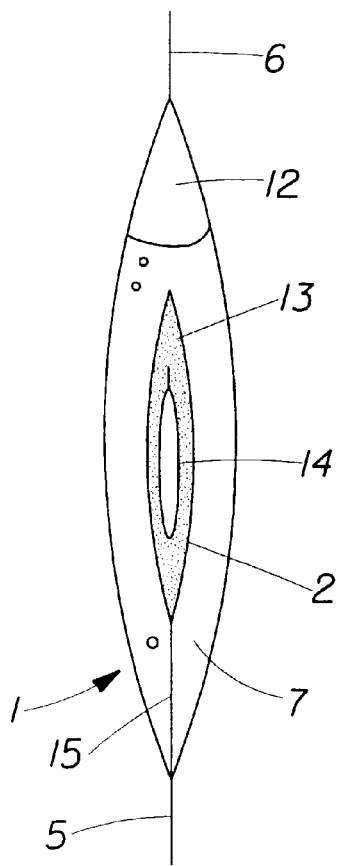
FIG. 4 is a side view of the outer container of one embodiment of the present invention.
Figure 5:
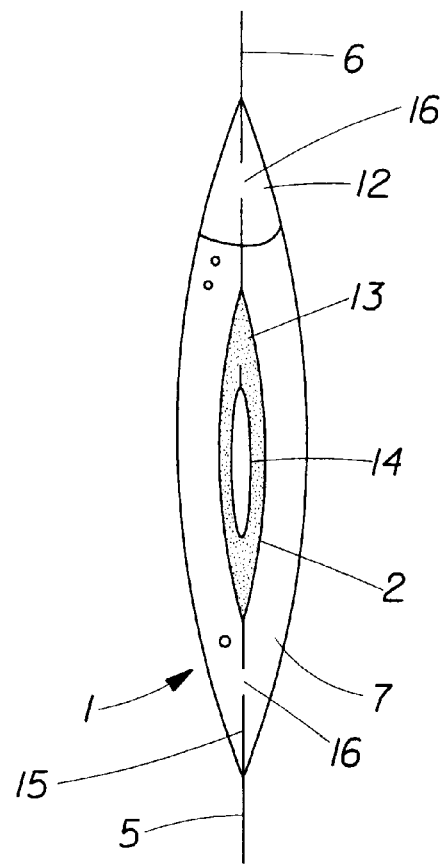
FIG. 5 is a side view of the outer container of one embodiment of the present invention.

In order to maximize the integrity of the system, prevent excess movement, and/or maintain a centralized location in larger packages, the heating/cooling element may be attached to the outside container 1. FIGS. 4 and 5 show examples of attaching the heating/cooling element 2 to the outer container that may be used. In the first embodiment, the heating/cooling element 2 may have at least one side of its exterior film longer than the other. The extension 15 may be polymeric on at least on one side. The extension 15 may be attached to the exterior package 1 by sealing the extension 15 in the flange 5 of the exterior package. The extension may cover the entire length of the flange or may traverse only a portion so that the flange 5 may seal to itself at the outer most edges and seal at least on one side to the extension 15.

In another embodiment, the extension 15 may be attached to opposing or adjacent and perpendicular edges of container 1 so that the heating/cooling element 2 is restricted in its movement. Further, in some embodiments the heating/cooling element 2 and its attachment means may be generally narrower than the container 1 so that product continuity may be maintained inside of the container. In cases where the width of the temperature-changing system and its attachment means is on parity with that of the container, fluid continuity may be low between the two opposing sides of the heating/cooling element 2 that reduce the convective heat transfer through at least a portion of the fluid. In this case, open communication ports 16 may be provided in the extension(s). It is realized that these communication ports can be any size or shape up to the size of the extension 15.

Redundancy in Outer Pack of Heat Generator

Figure 6:
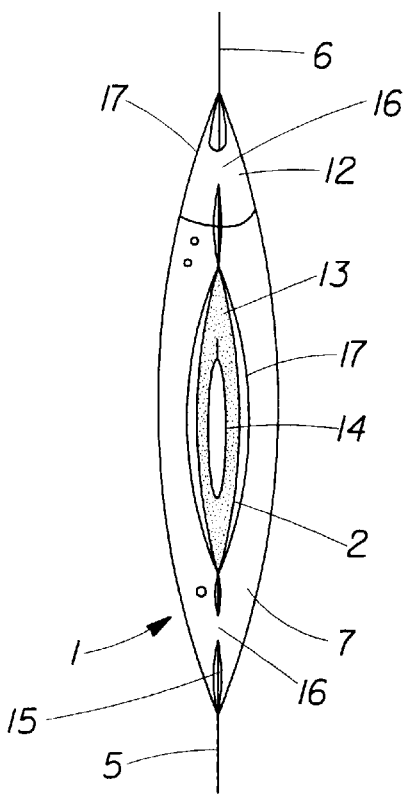
FIG. 6 is a side view of the outer container of one embodiment of the present invention.

In order to have additional protection from accidental leakage, an extra layer of film may be placed about the heating/cooling element 2 that is at least partially immersed in product 7 such as shown in FIG. 6. The redundant layer 17 may comprise a film such as polyethylene, polypropylene or any other polymeric structure. The film, for example, may have a thickness in the range from about 12 $\mu$m to about 100 $\mu$m. The redundant layer 17 may be sealed about the perimeter of the heating/cooling element 2 and may also have an extension 15 that may be attached to the outer container 1 such as at the edge seal 5.

External Package Configurations

Figure 7:
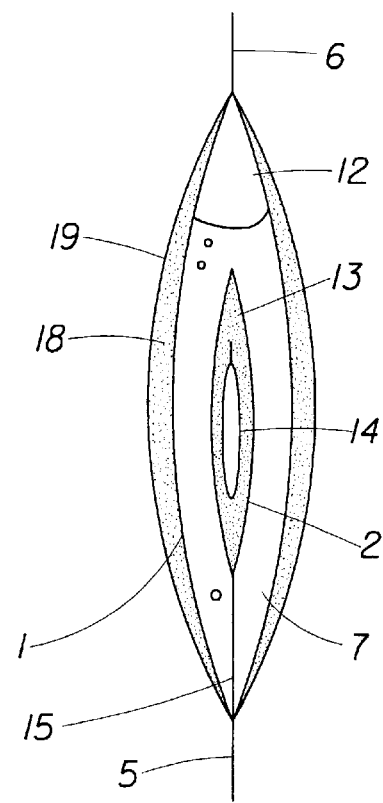
FIG. 7 is a side view of the outer container of one embodiment of the present invention.

An outer container 1 made in accordance with the present invention may take several forms. FIG. 1, for example, shows a first embodiment of a pouch while FIG. 7 shows a second embodiment including a pouch-within-a-pouch that may contain two distinct products 7 and 18. The inner pouch of the second embodiment contains product 7 and the outer pouch, which is defined by the exterior wall 1 of the inner container and the inner wall 19 of the external pouch, contains product 18. This embodiment may, for example, be used to mix and heat products 7 and 18 upon dispensing and may allow the inner product 7 to change states prior to being co-dispensed with the outer product 18. As previously described, the inner container may also be joined to the outer container via extensions and the extensions may also contain communication ports to maintain product continuity between opposing sides of container 1, which is immersed in the outer product 18.

Figure 8:
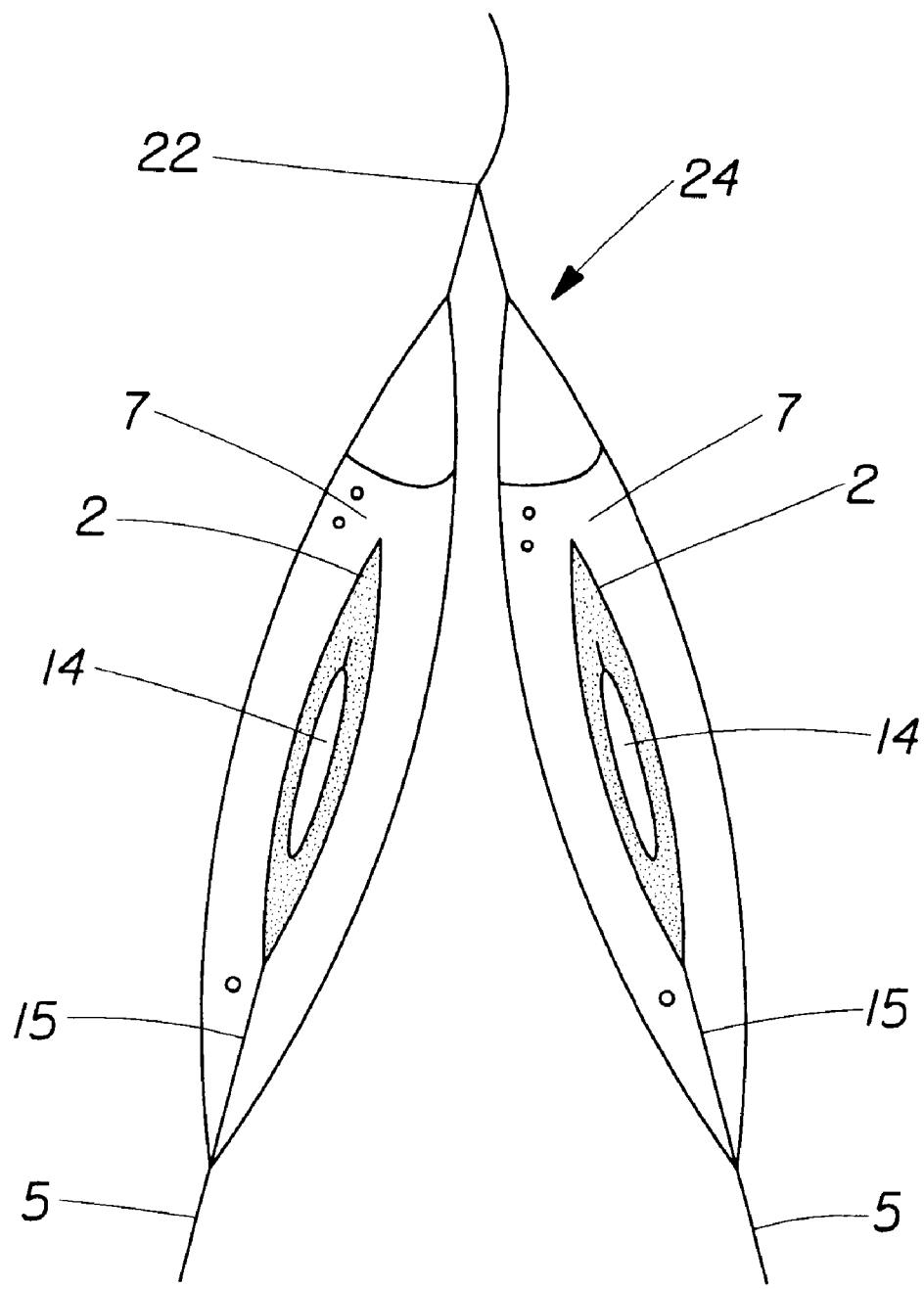
FIG. 8 is a side view of the outer container of one embodiment of the present invention.
Figure 9:
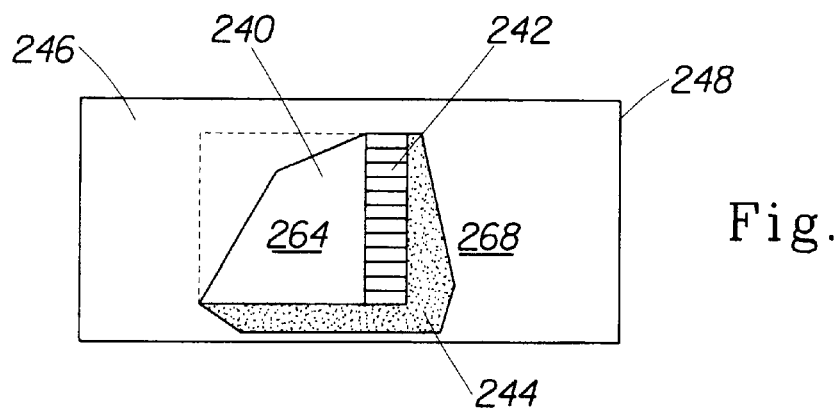
FIG. 9 is a top view of the temperature changing element of one embodiment of the present invention.
Figure 10:
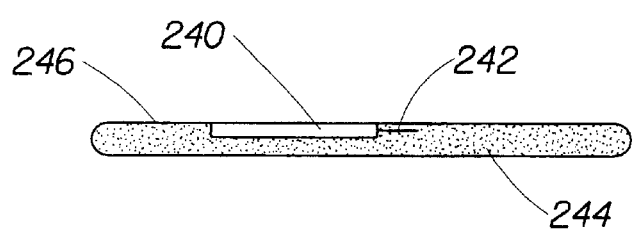
FIG. 10 is a side view of the temperature changing element of one embodiment of the present invention.

FIG. 8 shows yet another embodiment in which two or more packages 24 are linked together at an edge 22, each containing a product and a heating/cooling element 2. Alternatively, one or more of the multiple packages may contain a product without a heating/cooling element 2. Each package may be fastened at a common point(s) such as the edge seams, 5, or opening area, 22. This may allow one or more of the containers to be heated separately, and, possibly, at different temperatures, prior to dispensing. In addition, the one or more products may be mixed at the exit point of the multiple packages.

EXAMPLE 1

Hair Treatment Sachet

Figure 37:
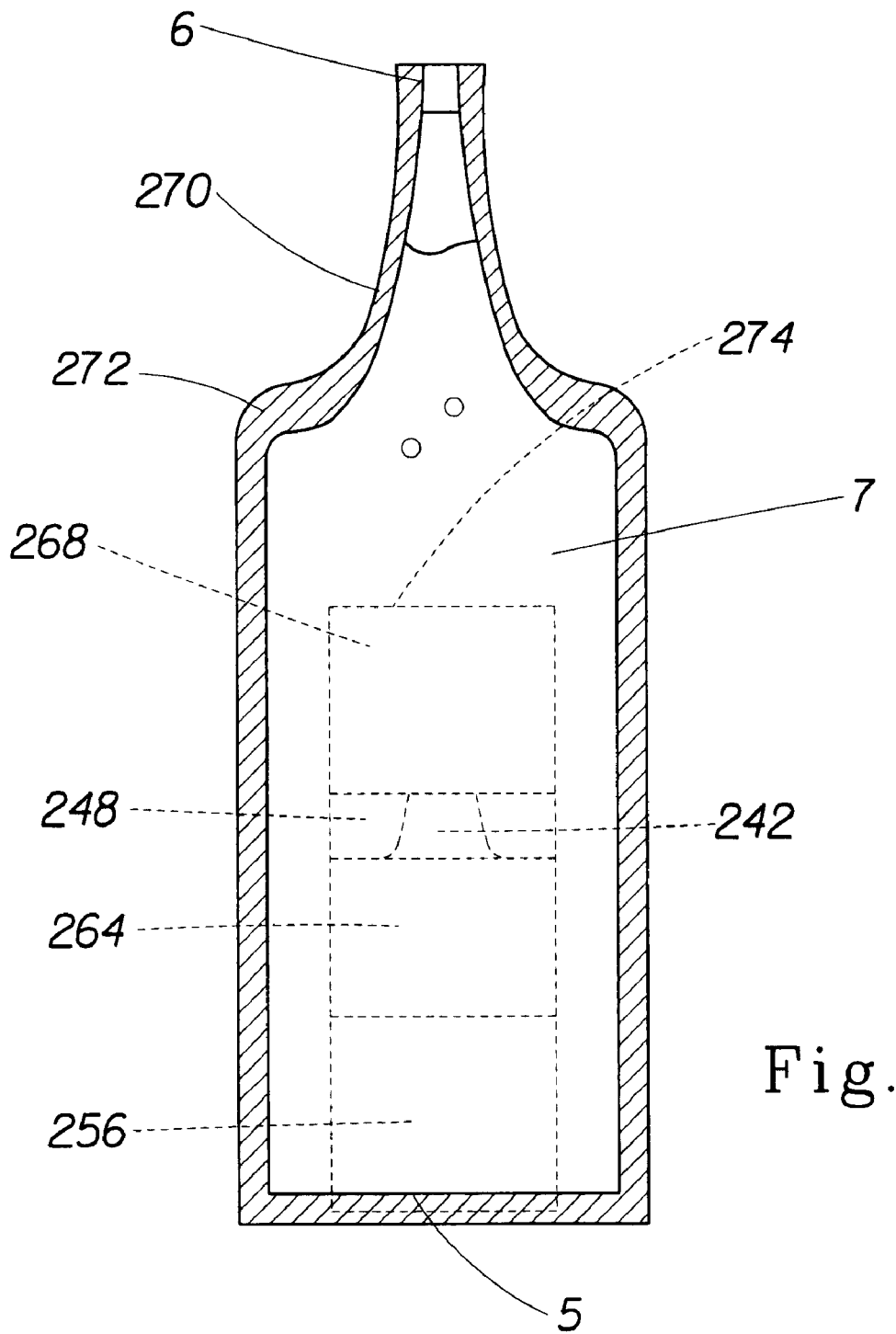
FIG. 37 is a side view of the inner dosing channel of one embodiment of the present invention.

One example of a package of the present invention is a hair treatment sachet such as shown in FIG. 37 that dispenses an oil treatment, or other hair treatment products, after internally heating or cooling the hair treatment product. This package has the ability to change the temperature of the product without the need of an external energy source (e.g., boiling water, microwave, etc.).

In one embodiment, two 5 inch×5 inch metalized oriented polypropylene films may be heat sealed on two sides forming a package that is open at its base and at the top. Along the inside wall two pieces of polyethylene foam (2 in×2 in), 20, have been sealed to provide an insulating layer between the heating element and the package walls. The 2.5 in×2.5 in heating/cooling element 274 is placed inside of the package. The outside wall of the heating/cooling element 274 can be made with a metallized oriented polypropylene with a Surlyn® sealant layer. Contained within the heating/cooling element 274 is a chamber 264 containing a first component of the exothermic/endothermic system, in this embodiment, approximately 3.4 cc of water. This chamber 264 can be sealed on four sides with a seal along one or more of the four sides being frangible. A second component may be placed within the outer container of the heating/cooling element 274, such as a mixture of approximately 3.4 grams of a 2:1 ratio of citric acid and calcium oxide mixed homogenously. The completed heating/cooling element 274 is placed within the outer container 270 and about 10 cc of Jojoba Oil Treatment® 7 is added surrounding the heat generator. The fourth side of the outer package is then sealed frangibly at 6. The outer container can be given two curving and diagonal seals leading to the top edge to form a dosing channel. A second frangible seal is made across the dosing channel as shown in figure. The second frangible seal 6 is preferably stronger then the first frangible seal 242 so that both are not ruptured at the same time. Also, the product in the package can be filled such that there is sufficient headspace to allow proper activation of the system. Proper activation of the system may be achieved by expelling the first component from the pouch 264 by squeezing the heating/cooling element without rupturing the frangible seal 6 of the outer container. Specifically, the package may then be squeezed rupturing the internal liquid sachet, mixing the first component (i.e., water) and the second component in chamber 268 (i.e., the calcium oxide/citric acid mixture). The combination of these two components results in an exothermic event that gives off energy into the product 7 surrounding the heating/cooling element. The product is heated and may be dispensed from the second frangible seal 6 at the package exit.

EXAMPLE 2

Beverage Cup

In a second example, a flexible self-heating stand-up pouch with a semi-rigid insert, such as shown in FIGS. 30–34, can comprise an outer container 76, a semi-rigid insert 72, product 7, and a heating/cooling element 86. The outer container may be made of a metalized PET film with a sealant layer. The film is formed into a stand up pouch with a gusset depth of 1 inch and flat bag width of 4.75 inches. Inserted into the outer container is a 76 mil insert made from polypropylene where 2 cut-outs of 3.5"×4.75 inches are heat sealed together along the two short edges 80, forming two welded sheets that take on an elliptical shape when compressed at the welded seams. The insert 72 is placed inside the container and the outer container edges can be sealed again to hold the polypropylene insert in place. Two heating/cooling elements 86 may be added, each containing 10 cc of water and 10 g of a 2:1 mixture of anhydrous citric acid and anhydrous calcium oxide. A beverage is added to the outer container 72 and the container is sealed along the edge 74. The system may be activated by squeezing the bag 266 to release the water by rupturing the cell at seal 242 in the heating/cooling element, which combines or reacts with the mixture of anhydrous citric acid and anhydrous calcium oxide to generate heat. To gain access, the pouch can be cut open and the contents dispensed in an easy fashion by grasping the semi-rigid inserts, which creates a cup-like feel.

EXAMPLE 3

Salon Nail Treatment

Figures 38, 39:
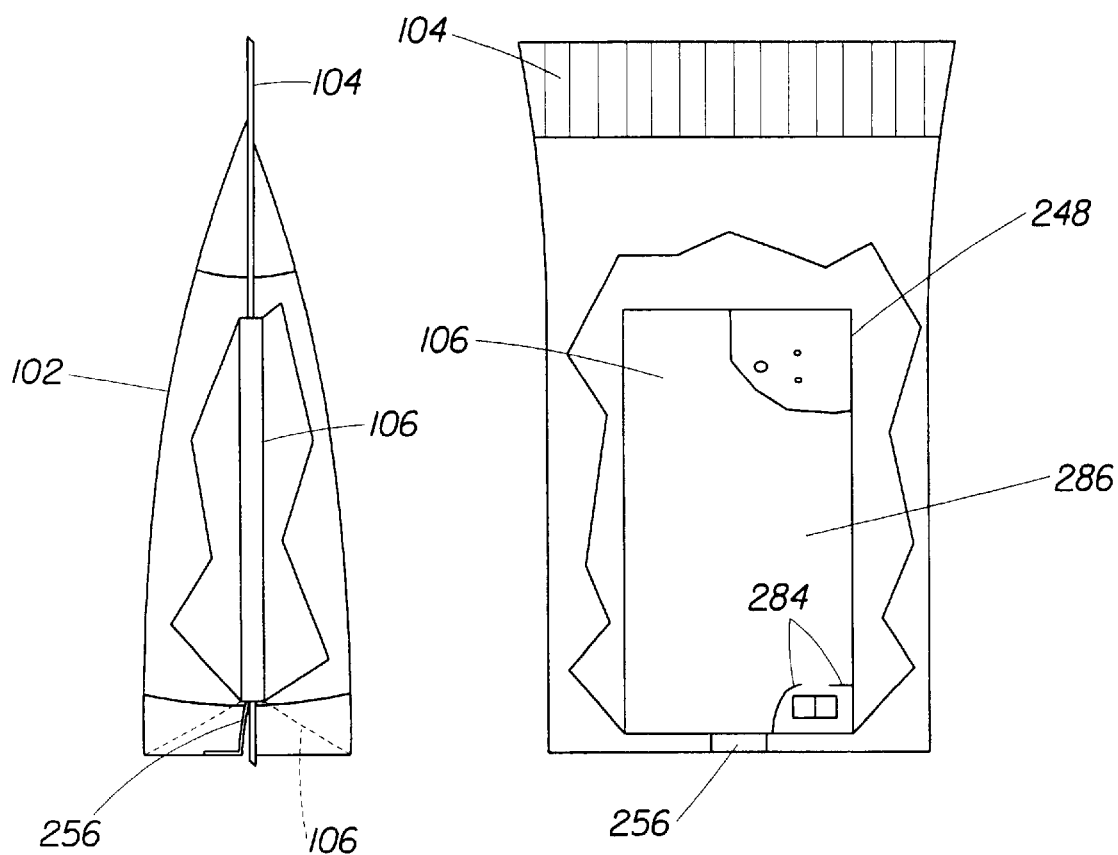
FIG. 38 is a plan view of the outer container of one embodiment of the present invention.
FIG. 39 is a plan view of the outer container of one embodiment of the present invention.

Another example for the use of an immersion heater is for salon-style heated fingernail treatments, such as shown in FIGS. 38 and 39. The system comprises of an outer container 102, a product 7 and a heating/cooling element 106. The outer container can be made of a metalized PET film with a sealant layer. The film is formed into a stand up pouch with a gusset depth of 1 inch and flat bag width of 4.75 inches. A heat generator is added, containing 100 cc of a 1:1 ratio of Sodium Acetate and water a system similar that in FIG. 26. Low melt-temp paraffin wax ($T_m$<135° F.) is added to the outer container and the container is sealed along the edge. Squeezing the bag to agitate the flexible disk located in the heating element sachet activates the system. To gain access, the pouch may be cut open at the top 104 and the melted paraffin wax is available for placement of the hand.

EXAMPLE 5

Figure 27:
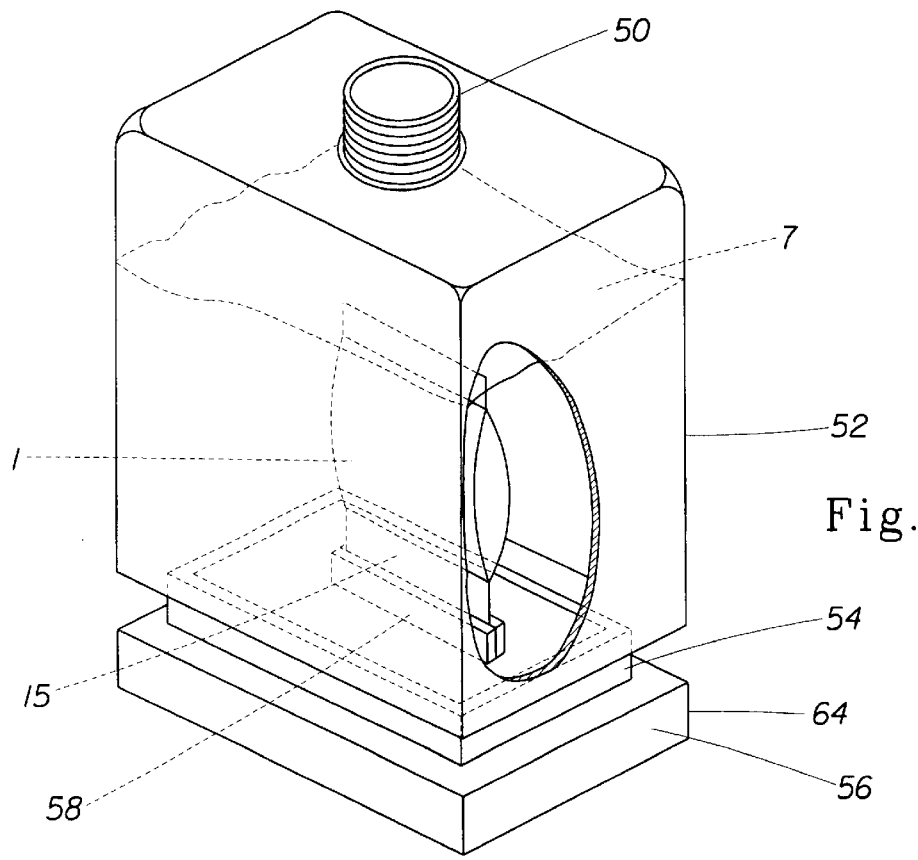
FIG. 27 is a perspective view of the outer container of one embodiment of the present invention.
Figure 28:
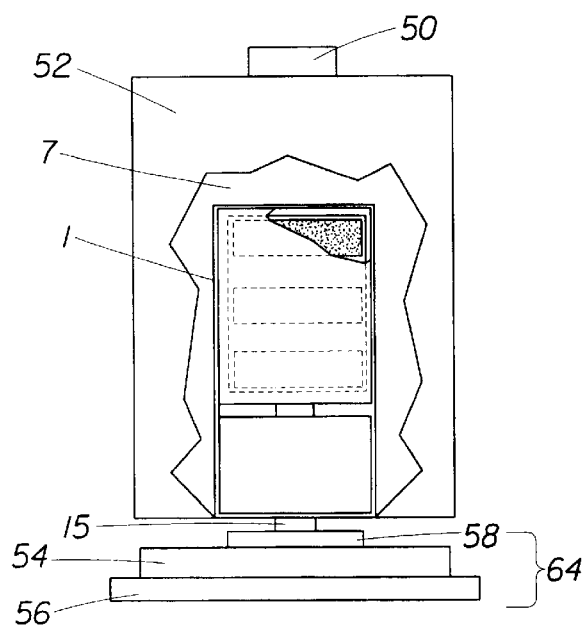
FIG. 28 is a side view of the outer container of one embodiment of the present invention.

FIGS. 27–28 shows a bottle, such as a polypropylene bottle having a thickness ranging from about 5 mil to about 100 mil. The bottle is designed with two opposing planar surfaces and an open bottom that accepts a snap-fit closure 64 on the bottom. The snap-fit closure is attached to a heating/cooling element via a clasp 58 via extension 15 on the heating element. Both are secured to the base of the bottle 52 after the product 7 is added. In subsequent use, when the bottle is squeezed, thereby activating the heating/cooling element, heat is imparted to the surrounding product which can be dispensed from the bottle through the opening 50 at the top. The closure may be pouring spout, nozzle, spray head, applicator tip or the like.

EXAMPLE 6

Internally Heated Dispensing Pad

Figure 35:
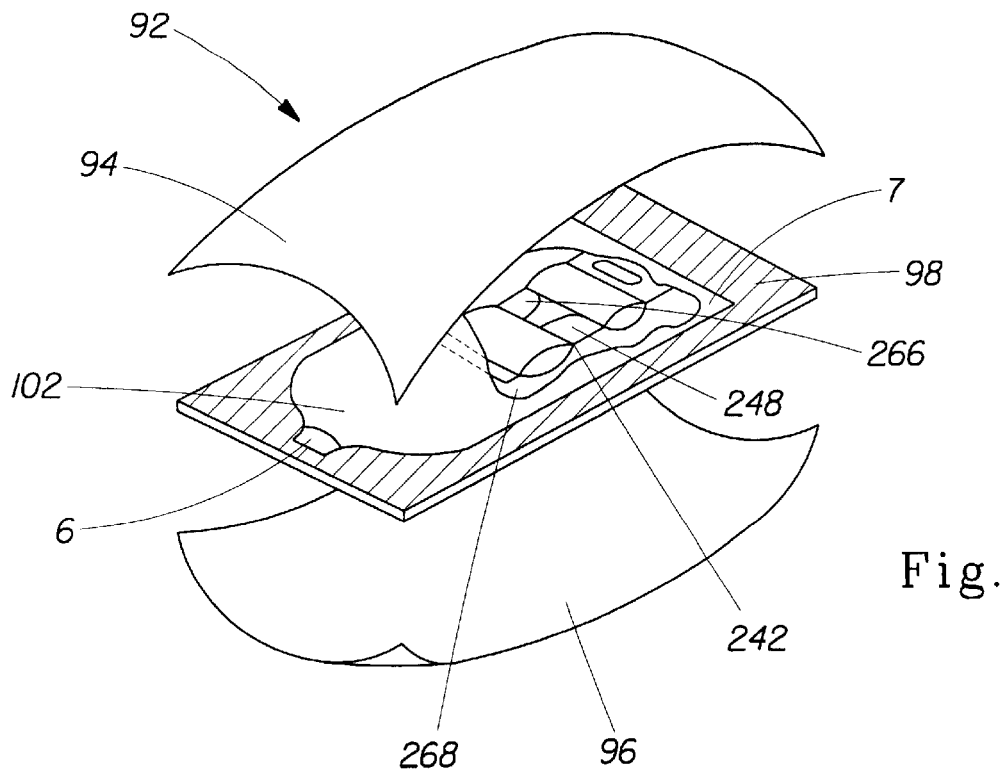
FIG. 35 is a perspective view of the outer container of one embodiment of the present invention.
Figure 36:
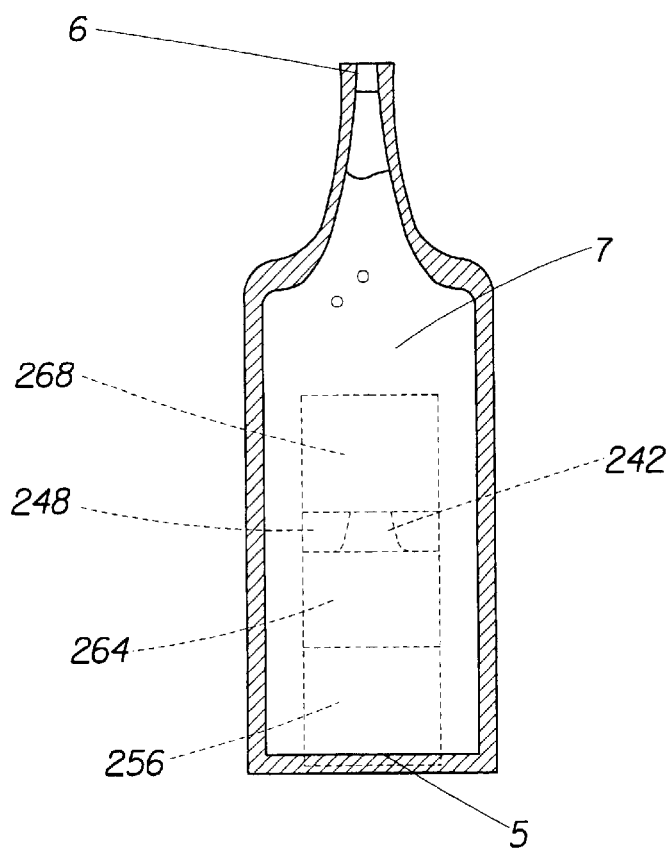
FIG. 36 is a plan view of the inner dosing channel of one embodiment of the present invention.

The embodiment in FIG. 35 comprises a dispensing package 98 with an integral temperature changing means 100 that may be immersed in the product 7 contained within the dispensing package. The dispensing package may be attached adhesively to an optional impermeable sheet 98 made from a polymeric film such as low-density polyethylene, polypropylene or a laminate structure such as metallized polypropylene laminated to Surlyn™. The optional impermeable sheet 98 may serve as a method for controlling the dispensing side of the system.

A product 7 may be heated or cooled and dispensed into a first substrate 94 which can be placed on either side of the heating and dispensing unit. A product 7 may dispense into the first substrate 94 due to the presence of an impermeable sheet 98 that may block product migration to the second substrate 96. The impermeable sheet may not be necessary in embodiments that require the product 7 to be delivered to the first substrate 94 and to the second substrate 96.

The dispensing package may have a frangible seal 6 from which the product 7 dispenses into substrate 94 where said product can be further delivered to a surface such as a floor, wall, counter-tops, hair, windows, car, skin, and the like. Optionally, the product may be delivered to the substrate 94 and allowed to evaporate if there is a heating action involved. An example may be the dispensing of an aroma, alcohol, and liniments such as Vicks Vapor Rub™ from the Procter & Gamble Company, Cincinnati, Ohio.

It should be clear that this execution could take on various shapes and sizes including that of a mitt, a pad with a retaining band for hand insertion with the fingers exposed, a pad, a wipe, and the like. Further any substrate or combination may be used depending on the product and the job to be performed.

Further, the force required to rupture the frangible seal for the fluid bag 266 should be preferably less than that required to rupture the frangible seal 6 for the dispensing package. This may ensure that the product temperature is changed prior to dispensing.

What is claimed is:

1. A temperature-changing modifying system for heating or cooling a product, said system comprising:
   a. a flexible outer container containing a product; and
   b. a self-enclosed temperature-changing element comprised of a flexible pouch at least partially immersed in said product, said flexible pouch having a first component disposed in a first compartment, and a second component,
   c. wherein said temperature-changing element is entirely contained within said container,
   d. wherein a rupturable barrier of said temperature-changing element is adapted to burst under an application of pressure to allow said first component and said second component to mix and thereby modify a temperature of said product.

2. The temperature-changing system of claim 1, wherein said rupturable barrier is a frangible seal.

3. The temperature-changing system of claim 1, wherein said second component is disposed in a second compartment and said rupturable barrier is disposed between said first compartment and said second compartment.

4. The temperature-changing system of claim 1, wherein said at least a portion of said first compartment may extend externally from the product containing portion of said outer container.

5. The temperature-changing system of claim 1, wherein said first component is flowable.

6. The temperature-changing system of claim 1, wherein said product is flowable.

7. The temperature-changing system of claim 1, wherein said temperature-changing element is self-enclosed.

8. The temperature-changing system of claim 1, wherein said flexible pouch is attached to said outer container.

9. The temperature-changing system of claim 1, wherein said outer container further comprises an opening.

10. The temperature-changing system of claim 1, wherein said flexible pouch has a first width dimension and said opening has a second width dimension, said first width dimension being greater than or substantially equal to the second width dimension.

11. The temperature-changing system of claim 1, wherein said opening includes a nozzle for dispensing.

12. The temperature-changing system of claim 1, wherein said opening nozzle is tapered.

13. The temperature-changing system of claim 1, wherein said pouch includes a redundant film layer.

14. The temperature-changing system of claim 1, having an opening dimension of said container, wherein said pouch having length and width dimensions greater than said opening dimension of said container.

15. The temperature-changing system of claim 1, is a flexible package and activation of pouch is accomplished by squeezing the outer container to apply pressure to at least a portion of the pouch.

16. The temperature-changing system of claim 1, wherein a dispensing orifice serves to restrain accidental ejection of hot/cold generator.

17. The temperature-changing system of claim 1, wherein a dispensing orifice is shaped and sized to dispense the product according to a pre-defined load-dispensing relationship.

18. The temperature-changing system of claim 1, wherein said pouch may be sealed to said container to prevent movement further comprised of:
   a. a heat generator designed so that one face is longer than the other, wherein the resulting tail is sealed to a portion of a 1st container; and
   b. a heat generator designed so that one face extends from two opposing edges so as to attach to the 1st container via two locations; and
   c. extensions having a hole to serve as communication point for a fluid so as to not cause any separation.

19. The temperature-changing system of claim 1, wherein said system causes a phase change in the product so as to put it into a flowable form.

20. The temperature-changing system of claim 1, wherein said container is lined with an integral insulator.

21. The temperature-changing system of claim 1, wherein said product and said system are pre-packaged together.

22. The temperature-changing system of claim 1, wherein all aspects of said system is contained within said container.

23. The temperature-changing system of claim 1, wherein said system is disposable.

24. The temperature-changing system of claim 1, wherein said system is surrounded by a substrate, and
   a. substrate takes the form of a pad, mitt, wipe with band with attachment means, wipe with band for insertion of hand.

25. The temperature-changing system of claim 1, wherein said container shares a common exit point with a multiple chamber system each comprising:
   a. the product, and
   b. said system.

26. The temperature-changing system of claim 1, wherein said system comprises:
   a. a method based on heat of solution, heat of neutralization, electro-chemical reaction, chemical reaction or crystallization.

27. The temperature-changing system of claim 1, wherein the outer container is flexible and has an integral polymeric insert where:
   a. said insert comprises two sheets sealed together, and
   b. said insert will form an elliptical shape when compressed on its axial edges.

28. The temperature-changing system of claim 1, wherein the outer container is a flexible bottle comprising: p1 a. an insertable plug for the base which contains the temperature-changing element, and
   b. enough flexibility so as to deform enough to activate said temperature-changing element when compressed along its axis travel from the base to opening.

29. A temperature modifying system for heating, said system comprising:
   a. a flexible outer container containing a product; and
   b. a self-enclosed temperature-changing element comprised of a flexible pouch at least partially immersed in said product and said temperature-changing element containing a liquid which is a saturated salt,
   c. wherein another element is adapted to create a nucleation site under an application of pressure to allow said saturation salt to crystallize.

\* \* \* \* \*